United States Patent
Liu et al.

(10) Patent No.: US 10,082,520 B2
(45) Date of Patent: Sep. 25, 2018

(54) ROTATIONAL FREQUENCY ESTIMATION FROM SENSED VIBRATIONS BASED ON A SUPERVISED LEARNING METHOD

(71) Applicant: Simmonds Precision Products, Inc., Vergennes, VT (US)

(72) Inventors: Lei Liu, Selburne, VT (US); Radoslaw Zakrzewski, South Burlington, VT (US)

(73) Assignee: Simmonds Precision Products, Inc., Vergennes, VT (US)

( * ) Notice: Subject to any disclaimer, the term of this patent is extended or adjusted under 35 U.S.C. 154(b) by 281 days.

(21) Appl. No.: 15/074,126

(22) Filed: Mar. 18, 2016

(65) Prior Publication Data
US 2017/0269118 A1  Sep. 21, 2017

(51) Int. Cl.
| | | |
|---|---|---|
| G01P 3/00 | (2006.01) | |
| G01P 7/00 | (2006.01) | |
| G01P 11/00 | (2006.01) | |
| G01P 3/44 | (2006.01) | |
| G01P 3/48 | (2006.01) | |
| G01H 1/00 | (2006.01) | |

(52) U.S. Cl.
CPC ............... *G01P 7/00* (2013.01); *G01H 1/003* (2013.01); *G01P 3/44* (2013.01); *G01P 3/48* (2013.01); *G01P 11/00* (2013.01)

(58) Field of Classification Search
CPC ............ G01P 7/00; G01P 11/00; G01H 1/003
USPC ........................................................ 702/147
See application file for complete search history.

(56) References Cited

U.S. PATENT DOCUMENTS

| | | | |
|---|---|---|---|
| 6,301,572 B1 | 10/2001 | Harrison | |
| 7,283,923 B2 | 10/2007 | Barila et al. | |
| 7,440,857 B2 | 10/2008 | Morel | |
| 2011/0231146 A1 | 9/2011 | Hsiao et al. | |

(Continued)

FOREIGN PATENT DOCUMENTS

| | | |
|---|---|---|
| CN | 105181122 A | 12/2015 |
| KR | 100666452 B1 | 1/2007 |

OTHER PUBLICATIONS

Extended European Search Report, for European Patent Application No. 17161554.5, dated Jul. 21, 2017, 9 pages.

*Primary Examiner* — Anthony Ho
(74) *Attorney, Agent, or Firm* — Kinney & Lange, P.A.

(57) ABSTRACT

Apparatus and associated methods relate to generating a frequency spectrum weighting function for use in estimating a rotational frequency of the rotating member. The estimation of the rotational frequency is based on vibrations sensed by an accelerometer remotely located from a rotating member. The frequency spectrum weighting function is generated by a supervised learning method. The method includes receiving a set of test vectors. The test vectors include a rotational frequency value of the rotating member and a vibrational frequency spectrum corresponding to vibrations propagated to the accelerometer. The vibrations include vibrations caused by the rotating member rotating at the rotational frequency. The method includes calculating a test weighting function, and then weighting the vibrational frequency spectra by the test weighting function. The method includes calculating a vector score indicative of whether the weighted vibrational frequency spectra promote the identification of the rotational frequency of the rotating member.

20 Claims, 3 Drawing Sheets

(56) References Cited

U.S. PATENT DOCUMENTS

| | | | |
|---|---|---|---|
| 2011/0295556 A1* | 12/2011 | Hedin | G01H 1/003 702/182 |
| 2016/0146954 A1* | 5/2016 | de Borms | G01V 1/005 367/189 |
| 2016/0273957 A1* | 9/2016 | Bendele | G01H 1/003 |

* cited by examiner

ROTATIONAL FREQUENCY ESTIMATION FROM SENSED VIBRATIONS BASED ON A SUPERVISED LEARNING METHOD

BACKGROUND

Many mechanical systems have rotating members that perform functions that cooperate with the mechanical system. Knowing the frequency of rotation of such rotating members is sometimes important. In mechanical systems with rotating members, rotational frequencies can be measured using tachometers or other such rotation sensors. These rotation sensors can be used in conjunction with accelerometers for diagnostic purposes, for example.

Using such rotation sensors, however, increases complexity, weight and/or cost of such systems. Additionally, the installation of tachometers and/or rotation sensors can limit mechanical designs and can require retrofitting existing mechanical systems if rotational frequency measurement is required.

It may be impractical to incorporate tachometers or other rotation sensors into certain mechanical systems. Some rotating members, for example may operate in a high temperature environment in which electro-mechanical sensors cannot survive. Some rotating members may be designed to operate in close confines that leave little room for addition of electro-mechanical sensors. Some rotating members may operate in caustic or otherwise harsh environments that may prohibit the inclusion of electro-mechanical sensors.

SUMMARY

Apparatus and associated devices relate to generating a frequency spectrum weighting function for use in estimating, using vibrations sensed by an accelerometer remotely located from a rotating member, a rotational frequency of the rotating member. The apparatus includes one or more processors and one or more storage devices encoded with instructions. When executed by the one or more processors, the instructions cause the apparatus to perform the step of receiving a set of test vectors. Each test vector includes a rotational frequency value indicative of a rotational frequency of the rotating member. Each test vector also includes a vibrational frequency spectrum corresponding to vibrations propagated to the accelerometer remotely located from the rotating member. The vibrations include vibrations caused by the rotating member rotating at the rotational frequency. The instructions cause the apparatus to perform the step of calculating a test weighting function. The instructions cause the apparatus to perform the step of calculating a set of weighted test vectors. Each weighted test vector includes a weighted vibrational frequency spectrum calculated by taking a product of vibrational frequency spectrum of a corresponding one of the test vectors and the test weighting function. Each weighted test vector includes a vector score relating an amplitude of the weighted vibrational frequency spectrum corresponding to the rotational frequency of the rotating member to a maximum amplitude of the weighted vibrational frequency spectrum corresponding to frequencies not including the rotational frequency of the rotating member. The instructions cause the apparatus to perform the step of calculating a set score by summing the vector scores of the set of weighted test vectors. The instructions also cause the apparatus to perform the step of evaluating an end condition. If the end condition is met, then the frequency spectrum weighting function is assigned to the test weighting function that was last calculated. If, however, the end condition is not met, then the microprocessor recalculates the test weighting function until the end condition is met.

In some embodiments, apparatus and associated methods relate to estimating, using a frequency spectrum weighting function, a rotational frequency of a rotating member. The apparatus includes an accelerometer, one or more processors, and one or more storage devices encoded with instructions. When executed by the one or more processors, the instructions cause the apparatus to perform the step of retrieving, from the one or more storage devices, the frequency spectrum weighting function. The instructions cause the apparatus to perform the step of receiving, from the accelerometer, temporal signals indicative of vibrations. The vibrations are sensed by the accelerometer remotely located from the rotating member. The instructions cause the apparatus to perform the step of transforming the temporal signals indicative of the vibrations to the vibrational frequency spectrum. The instructions cause the apparatus to perform the step of calculating a weighted vibrational frequency spectrum by taking a product of vibrational frequency spectrum and the frequency spectrum weighting function. The instructions cause the apparatus to perform the step of selecting a frequency corresponding to a maximum amplitude of the weighted vibrational frequency spectrum. The instructions also cause the apparatus to perform the step of associating the frequency corresponding to the maximum amplitude of the weighted frequency spectrum with the rotational frequency of the rotating member.

An apparatus for estimating, using a frequency spectrum weighting function, a rotational frequency of a rotating member includes an accelerometer. The apparatus includes one or more processors. The apparatus also includes one or more storage devices encoded with instructions that when executed by the one or more processors, cause the apparatus to perform a method for estimating the rotational frequency of the rotating member. The method includes retrieving, from the one or more storage devices, the frequency spectrum weighting function. The method includes receiving, from the accelerometer, temporal signals indicative of vibrations, the vibrations sensed by the accelerometer remotely located from the rotating member. The method includes transforming the temporal signals indicative of the vibrations to the vibrational frequency spectrum. The method includes calculating a weighted vibrational frequency spectrum by taking a product of vibrational frequency spectrum and the frequency spectrum weighting function. The method includes selecting a frequency corresponding to a maximum amplitude of the weighted vibrational frequency spectrum. The method also includes associating the frequency corresponding to the maximum amplitude of the weighted frequency spectrum with the rotational frequency of the rotating member.

DETAILED DESCRIPTION

Apparatus and associated methods relate to estimating a rotational frequency of a rotating member based on remotely sensed vibrations. The rotating members can cause vibrations due to an imbalance associated with the rotating member. Such an imbalance can be a result of either an intentional design asymmetry or an unintentional manufacturing variation, for example. These vibrations caused by an imbalanced rotating member can then propagate through structural components mechanically coupling the unbalanced rotating member and a vibration detector, such as, for example, an accelerometer. The propagated vibrations can be sensed by an accelerometer remotely located from the rotating member. These sensed vibrations can then be used to estimate a rotational frequency of the imbalanced rotating member.

Figure 1:
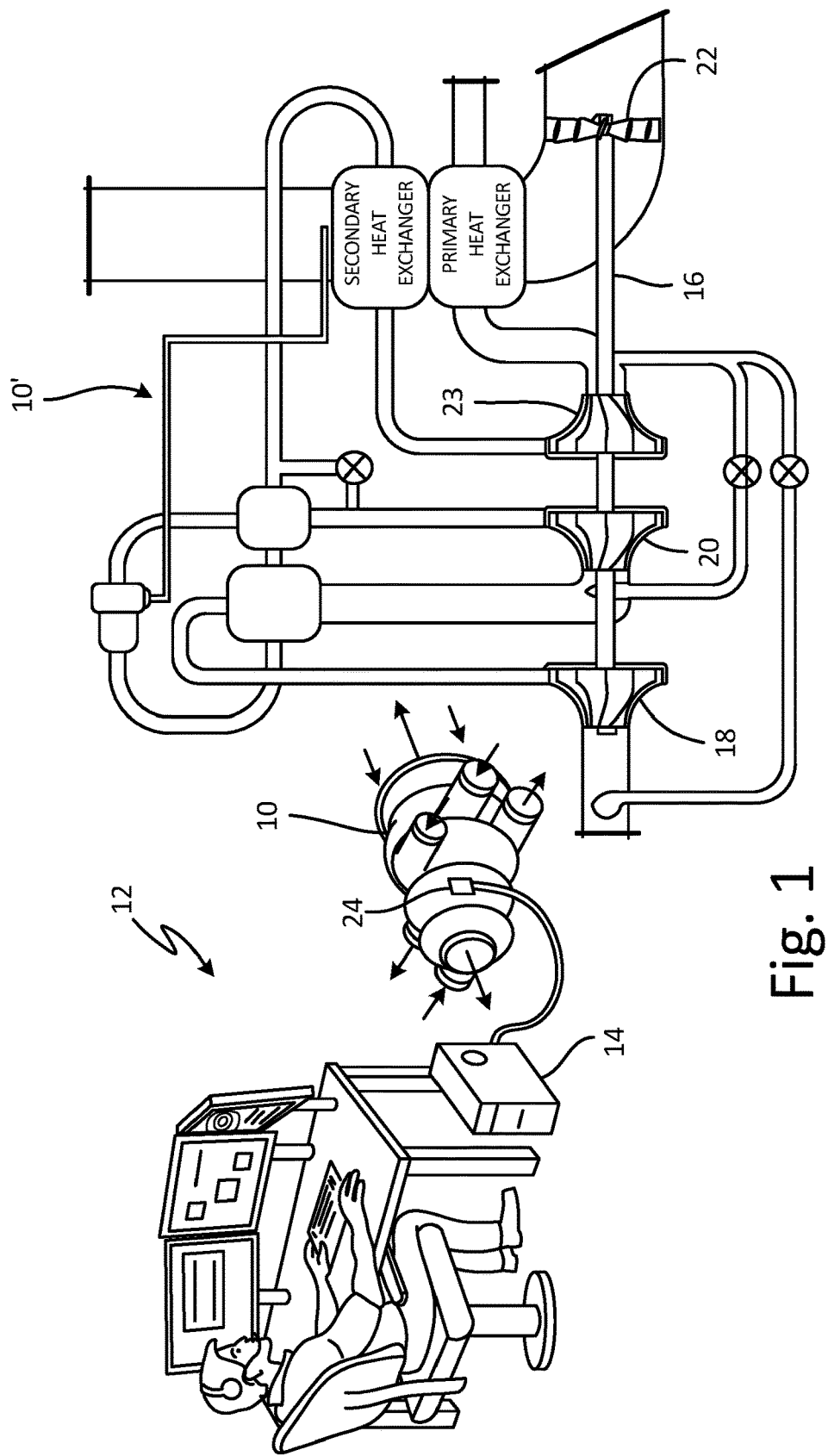
FIG. 1 is a schematic illustration of an exemplary scenario in which rotational frequencies may be estimated using sensed vibrations.

FIG. 1 is schematic illustration of an exemplary scenario in which rotational frequencies may be estimated using sensed vibrations. In FIG. 1, rotating machinery system 10 is in a testing station 12. In the depicted embodiment, rotating machinery system 10 is an air cycle machine of an aircraft. The methods and apparatus disclosed herein, however, are applicable to any rotating machinery system that generates measurable vibrations. Rotating machiner system is depicted both in a perspective view 10 and in a schematic view 10'. Testing station 12 also includes rotational frequency estimation system 14. Rotational frequency estimation system 14 may generate a frequency spectrum weighting function for use in estimating a rotational frequency of one or more rotating members of rotating machinery system 10. Such a frequency spectrum weighting function may be applied to a sensed vibrational frequency spectrum to provide spectral assistance in identifying a rotational frequency of a specific rotating member.

Rotating machinery system 10, 10' can include many rotating members, including drive shaft 16 coupled to axial fan 22, compressor 23 and multiple turbines 18, 20. A gear box may drive axial fan 22 and/or turbines 18, 20 at a different rotational frequency or at different frequencies than a rotational frequency of compressor 23, for example. Axial fan 22 may rotate at a rotational frequency that is correlated with rotational frequencies of multiple centrifugal compressors 18, 20. Other rotating members, such as, for example, air pumps, fuel pumps, etc., may rotate at frequencies that are uncorrelated to the rotational frequency of multiple centrifugal compressors 18, 20. Because of the many rotating members and the many rotational frequencies, identification of a specific rotational frequency corresponding to a specific rotating member can be difficult.

Rotating machinery system 10 has accelerometer 24 mounted on a stationary frame member. Here, the term stationary can be defined as unmoving with respect to the various rotating members. Accelerometer 24 can be used to sense vibrations of the various rotating members. Rotational frequency estimation system 14 interfaces with rotating machinery system 10. Rotational frequency estimation system 14 is in communication with accelerometer 24. Accelerometer 24 can provide rotational frequency estimation system 14 with signals indicative of sensed vibrations. Rotational frequency estimation system 14 can generate frequency spectrum weighting functions corresponding to various rotating members. Rotational frequency estimation system 14 can generate frequency spectrums for signals received from accelerometer 24, apply frequency spectrum weighting functions, and estimate rotational frequency. The estimated rotational frequency, so calculated, can be tracked locally or sent to other systems for further use.

The path of propagation from a rotating member to the remotely located accelerometer may distort the vibrations. These propagated vibrations may be amplified, attenuated, and/or distorted in ways characterized by various transfer functions associated with the path through which the vibrations are transmitted from the rotating member to the remotely located accelerometer. Furthermore, other vibration sources can contribute additional vibrations (e.g., vibrational noise) along various propagation paths to the accelerometer. The accelerometer will then sense both the desired, albeit distorted, vibrations as well as the undesired noise vibrations (e.g., those that are unrelated to the rotating member whose rotational frequency is sought).

Using supervised learning techniques, a weighting of the frequency spectrum of the sensed vibrations can be generated so to magnify the rotating member's vibrations and/or minimize the noise vibrations. Such a weighted frequency spectrum can facilitate identification of vibrations associated with the rotating member. Various supervised learning techniques can be used to facilitate enhanced estimation of a rotational frequency of a rotating member. Some of these various techniques will be described below.

Frequency spectrum weighting functions can be generated to magnify frequencies of vibrations associated with the rotating member from among other unrelated frequencies of vibrations. Such frequency spectrum weighting functions suitable for magnifying frequencies of vibrations associated with the rotating member can vary greatly from one machine configuration to another and/or from one rotating member to another. Generating such frequency spectrum weighting functions can be further complicated by environment noise characteristics caused by mechanically coupling additional unrelated vibration sources into the system via supporting structures, ground transmission, etc. Therefore, application of supervised learning to each specific machine configuration and/or installation can produce a frequency spectrum weighting function that is suitable for each specific configuration and/or installation.

A rotating member can generate a vibration corresponding to the frequency of rotation. For example, a member that is rotating at a rotational frequency of $f_{member}$ can generate vibrations at frequencies $f_{vibration}=Nf_{member}$, where N is a positive integer corresponding, for example, to the number of blades on a fan. In a simplified scenario, $f_{vibration}=f_{member}$. If, at a location of a remote accelerometer, a magnitude of a sensed vibration of the frequency $f_{member}$ is greater than all the amplitudes of all other frequencies in the frequency band being sensed by the remote accelerometer, then the rotational frequency of the rotating member can be estimated by selecting the frequency corresponding to the maximum amplitude. In practice, however, the amplitude of the $f_{vibration}$ can be less than amplitudes of other frequencies in the frequency band being monitored, and so such a simplified estimation method can be inaccurate in those situations.

Using supervised learning to generate a frequency spectrum weighting function can be applied to different mechanical systems. The generated frequency spectrum weighting function multiplies or weights for the various magnitudes of sensed vibrational frequencies within a frequency band. The frequency corresponding to the maximum amplitude of such a weighted frequency spectrum can be selected as the estimation of the rotational frequency of the rotating member. The frequency spectrum weighting function can act analogous to a magnifying lens by amplifying the sensed vibrations corresponding to a specific rotating member relative to the sensed vibrations unrelated to the specific rotating member.

Because the rotational frequency can be arbitrarily located within the sensed frequency band, and various systems have various spectral noise signatures, determining a usable frequency spectrum weighting function can be quite complex. Also, the dimensionality of the problem can be large. Using high resolutions of frequency and/or considering high numbers of harmonics can significantly increase the dimensionality. If a large number of training sets is used in the supervised learning method, the problem may become very complex and/or difficult to solve.

A supervised learning algorithm can be used to obtain a frequency spectrum weighting function for identification of a vibrational frequency corresponding to a specific rotating member. The supervised learning algorithm can be extended to identify vibration frequencies corresponding to harmonic frequencies of the rotating member. A non-convex optimization model for the problem can be modified so as to make the optimization model convex. A method of gradient descent can be used to provide solution convergence of the convex optimization model. The frequency spectrum weighting function generated by such a convergence can then be used in the original non-convex optimization model to find a suitable frequency spectrum weighting function for estimating rotational frequency based on sensed vibrations.

Rotational frequency can be estimated by identifying a frequency or frequencies of a sensed vibration associated with the rotating member. If the magnitude of the frequency component of the sensed vibration associated with the rotating member is large enough such that it is a maximum within a desired search frequency range, then the rotational frequency of the rotating member can be estimated by selecting the frequency corresponding to the maximum sensed vibration magnitude. Mathematically, this can be expressed as:

$$\text{Find } \bar{s} \quad (1)$$
$$\text{s.t.} \quad A(\omega_{\bar{s}}) > A(\omega_s) \; \forall \, s \in S, s \neq \bar{s}$$

Here, $A(\omega)$ is the magnitude of a sensed vibration having a frequency $\omega$ within frequency band. The subscripts $s$ and $\bar{s}$ are indices in a set $S$ defined by a search frequency region $\Omega$.

It is not always the case in practice that the magnitude of a frequency component of the sensed vibrations associated with the rotating member is large enough such that it is a maximum within a desired search frequency range. In some mechanical systems, the magnitude of the frequency component of the sensed vibration associated with the rotating member may be a maximum within its immediate neighborhood of frequency components, but may not be a global maximum over the entire search frequency range. Other sensed vibrations unrelated to the rotating member can have magnitudes of frequency components that are greater than the frequency component of the sensed vibrations associated with the rotating member.

To correctly identify frequency components of sensed vibrations associated with the rotating member in such situations, a frequency spectrum weighting function is used to multiply or give weights to magnitudes of frequency components of the sensed vibrations. A frequency corresponding to the maximum amplitude of the sensed vibrations is selected as the rotational frequency of the rotating member. Using such a frequency spectrum weighting function changes Eq. (1) to yield:

$$\text{Find } \bar{s} \quad (2)$$
$$\text{s.t.} \quad W(\omega_{\bar{s}}) \cdot A(\omega_{\bar{s}}) > W(\omega_s) \cdot A(\omega_s) \; \forall \, s \in S, s \neq \bar{s}$$

Here, $W(\omega)$ is the frequency spectrum weighting function to be determined.

The frequency spectrum weighting function $W(\omega)$ acts as a lens within the search frequency range. A usable frequency spectrum weighting function can amplify sensed vibrations corresponding to frequencies associated with the rotating member relative to sensed vibrations corresponding to frequencies unrelated to the rotating member.

Supervised learning techniques are based on training data. Training data can include sets of training vectors. Each of the training vectors includes both sensed frequency spectrums and a rotational frequency value of the rotating member for a given system configuration. Many such vectors can be used to facilitate determination of a frequency spectrum weighting function $W(\omega)$. Eq. (2) can be used in an optimization model. The optimization can be stated as minimizing the total number of training vectors in which the condition expressed in Eq. (2) is not satisfied. Mathematically, this can be expressed by first defining an indicator functions as:

$$I_-(x) = \begin{cases} 1 & x > 0 \\ 0 & x \leq 0 \end{cases} \text{ and } I_+(x) = \begin{cases} 1 & x \geq 0 \\ 0 & x < 0 \end{cases} \quad (3)$$

Therefore, the optimization problem can be written by defining an objective function and a constraint as follows:

$$\text{Min. } f(W) = \sum_{k=1}^{K} I_-\left(\sum_{s \in S, s \neq s_k} I_+[g(s, k, W)]\right) \quad (4)$$
$$g(s, k, W) = W(\omega_{s_k}) \cdot A_k(\omega_{s_k}) - W(\omega_s) \cdot A_k(\omega_s)$$
$$\text{s.t.} \quad W(\omega) \geq 0$$

Here, K is the total number of training vectors, $A_k$ is the magnitude of the frequency spectrum and the subscript $s_k$ denotes the specific index within the set of indices S corresponding to the frequency associated with the rotating member for the $k^{th}$ training vector. Note that the constraint $W(\omega) \geq 0$ is added to guarantee that a weighted magnitude is physically meaningful (always non-negative).

The objective function in Eq. (4) has a fairly complex form and is non-convex. In particular, the non-smoothness of the indicator functions in Eq. (3) makes it non-differentiable at x=0. Coupled with the composition of the indicator function, this property makes the overall minimization difficult to be solved, in this form, using descent based approaches. In some descent based approaches, a gradient of the objective function with respect to the weighting function is computed. A descent direction is calculated based upon the gradient. A descent distance is calculated. The descent distance is the numerical distance that is traveled in the descent direction. A new weighting function is then calculated.

Global optimization approaches using heuristics to explore the search space may be used to directly obtain a solution for a related minimization problem. A few such approaches are: simulated annealing; particle swarm; and/or genetic algorithms. The speed and performance of these approaches can be sensitive to heuristic parameters chosen deliberately, if not arbitrarily. It can also be difficult to prove or justify whether results obtained using arbitrarily selected heuristic parameters are optimal, given limited computational resources. More deterministic approaches based on convex optimization can sometimes lead to a better solution.

It can be seen from Eq. (4) that the core of the composite objective function $$I_-\left(\sum_{s\in S, s\neq s_k} I_+[g(s, k, W)]\right),$$

is a logical-OR function with respect to $I_+[g(s, k, W)]$. Its value can be zero only if the most inner parts, all the g(s, k, W) terms, are less than zero. Note that, if the search frequency range S has a dimension of $N_s$, the dimension of decision variables $W(\omega)$ is also $N_s$ but there are only $N_{s-1}$ of g(s, k, W) terms to be evaluated for the $k^{th}$ training data set. This reflects the original objective that a set of weighted magnitudes is considered good if and only if the amplitude of the sensed vibration frequency associated with the rotating member is larger than all amplitudes of the other sensed vibration frequencies. Alternatively, this implication can be obtained by using the maximum of g(s, k, W) term, such that:

$$I_-\left(\sum_{s\in S, s\neq s_k} I_+[g(s, k, W)]\right) \equiv I_-(\max[g(s, k, W)]), \forall s \in S, s \neq s_k \quad (5)$$

Therefore, a set of new decision variables $H_k = \max[g(s, k, W)]$ can be introduced and the optimization problem in Eq. (4) may be rewritten as:

$$\text{Min. } f(W) = \sum_{k=1}^{K} I_-(H_k) \quad (6)$$

$$\text{s.t. } W(\omega_{s_k}) \cdot A_k(\omega_{s_k}) - W(\omega_s) \cdot A(\omega_s) \leq H_k, \forall s \in S, s \neq \bar{s}$$

$$W(\omega) \geq 0$$

It can be seen from Eq. (6) that all the constraints are convex, noticing that $A_k$ are constants obtained from training data, and the objective function is transformed to use the new decision variables. The indicator function can be approximated in various ways, including: a hinge loss function used in support vector machines; a log loss function used in logistic regression; a square loss function; and a sigmoid function. Although the problem given in the form of Eq. (6) is not restricted from using any of these functions, the demand on large scale S and K can benefit from options with smooth and convex properties. If the indicator function $I_-$ is replaced with a smooth and convex function, solutions can be efficiently obtained using gradient descent approaches.

Two approximation functions, i.e. a quadratic function and an exponential function, can be used to modify the objective function given in equation six, and are given by:

$$\text{Min. } f(W) = \sum_{k=1}^{K} (H_k + a)^2 \quad (7)$$

$$\text{Min. } f(W) = \sum_{k=1}^{K} e^{bH_k} \quad (8)$$

Here, the parameters a and b are constants for each of the approximation functions, respectively. One purpose for using these approximation functions is to provide proper scaling and to improve numerical stability. In Eq. (7), the parameter a also gives an offset to properly penalize the case in which $H_k=0$. For typical training vectors, both a and b can be chosen to be equal to 1.

Note that both approximations result in creating a desirable objective function for the case in which $H_k=0$. The difference in results obtained using both approximations should only be caused by numerical errors. The quadratic objective function can be used by quadratic programming solvers and is perhaps more likely to find use. Although the exponential objective function can require a nonlinear programming solver, such an exponential objective function can sometimes avoid problems that can be present when using the quadratic objective function, which may limit the ability of finding optimal solutions in some cases.

It should be noted that neither of the objective functions given by Eq. (7) and Eq. (8) possess the exact same properties of the original objective function given in Eq. (6). The original indicator function $$\sum_{k=1}^{K} I_-(\ldots)$$

operates as a counting function by counting the total number of failing cases—cases in which the weighted magnitude of frequency component corresponding to sensed vibrations associated with the rotating member is less than at least one other weighted magnitude of a frequency component of a sensed vibration unrelated to the rotating member. Each of the new objective functions given by Eq. (7) and Eq. (8), however, operates on sub-objectives representing a maximum weighted magnitude difference between a frequency component associated with the rotating member and the other frequency components in the training vector. The summations in Eq. (7) and Eq. (8) can be, in some sense, equivalent to a weighted-sum approach in multi-objective optimizations, except that a unit weight is applied to all sub-objectives. Because of this difference, the objective of the approximation can be largely affected by those failure cases since the approximation does scale with respect to the sub-objectives. In other words, the approximations given by Eq. (7) and Eq. (8) may make the resulting frequency spectrum weighting function parameters less robust with respect to heavy outliers. A further improvement can be made by replacing the approximation with the sigmoid function. But such a replacement can result in a loss of convexity.

To complete the formulation, an additional coefficient, with respect to unique reference frequency—the rotational frequency of the rotating member—in all training vectors of a training vector set, is added to Eq. (7) and (8) and is given by:

$$\text{Min. } f(W) = \sum_{k=1}^{K} N_k (H_k + a)^2 \text{ or Min. } f(W) = \sum_{k=1}^{K} N_k e^{bH_k} \quad (9)$$

Here, $N_k = \text{count}(s_k \equiv s_{\bar{k}})/K$, $\forall \bar{k} \in [1, \ldots, K]$. The coefficient $N_k$ is meant to provide additional weighting in the objective function for potentially unbalanced groups of reference frequencies in training vectors. For example, a particular reference frequency could occur more or less frequently than other reference frequencies in a particular set of training data. In such cases, the optimization result is more likely to perform well when the rotating member is rotating at such frequently occurring reference frequency, but may suffer when the rotating member is operating at other frequencies.

Harmonic vibrations having frequencies of integral multiples of a fundamental frequency can exist along with the fundamental frequency vibration caused by the rotating member. Low-order harmonic vibrations can have small magnitudes due to misalignment, for example. High-order harmonic vibrations can also have large magnitudes, in certain machines as a result of their particular designs (e.g., gear meshing or blade passing). A jointed search that covers multiples of the intended search regions may be therefore desirable when a rotating member causes harmonic vibrations.

The condition in Eq. (2) may be further extended to yield:

$$\sum_{m \in M} W(m\omega_{\bar{s}}) \cdot A(m\omega_{\bar{s}}) > \sum_{m \in M} W(m\omega_s) \cdot A(m\omega_s) \quad (10)$$

$$\forall s \in S, s \neq \bar{s}, m \in M$$

Here, M is a set of integers to include the fundamental (m=1) and other desired harmonics, the weight $W(m\omega)$ and the magnitude $A(m\omega)$ corresponding to the particular harmonic order number m. Note that the indices of $A(m\omega)$ where $m \neq 1$ may not necessarily be exact multiples m of the indices of $A(\omega)$ due to the discretization in peak spectrum which will be described below.

The optimization problem with the new conditions given in Eq. (10) can be solved using the same process described above. Given that the dimension of the search space S is $N_S$ and the dimension of M is $N_M$, the number of related inequality constraints will remain as $K \times (N_S - 1)$, but the number of decision variables will be increased to $N_M \times N_S + K$. With a large $N_S$, the scale of the optimization problem may grow to be too large to be handled by some solvers.

An additional way to take advantage of the existence of prominent harmonics without significantly increasing the scale of the problem is by adopting a two-step optimization approach (e.g., using a sum of weighted magnitudes obtained from multiple learning to further enhance the result). The first step is to obtain weights for magnitude of vibration frequencies for each individual harmonic using Eq. (9) and related constraints. The second step is then to obtain an additional set of weights for the magnitudes of the sensed harmonics of the frequencies within the frequency band. The weights corresponding to the harmonics can be uncorrelated amplitudes of the sensed vibrations, such that Eq. (10) can be written as:

$$\sum_{m \in M} U(m) \cdot [W_m(\omega_{\bar{s}}) \cdot A(m\omega_{\bar{s}})] > \sum_{m \in M} U(m) \cdot [W_m(\omega_s) \cdot A(m\omega_s)] \quad (11)$$

$$\forall s \in S, s \neq \bar{s}, m \in M$$

Here, $U(m)$ are the new weights to be determined, and $W_m(\omega)$ are the weights learned from optimization in the first step. Enhanced results can be obtained by joining individual learning results together.

The determination of $U(m)$ can be modeled as the same optimization problem in Eq. (9). Thus, the individual weights $U(m)$ can be obtained using a similar approach as is used to obtain the weights $W_m$ in the first step. The number of decision variables is $N_M + K$ and the number of inequality constraints is $K \times (N_S - 1)$. Accordingly, a large scale problem can be broken into several smaller scale problems. In practice, this two-step approach has proven to work well.

Fast Fourier Transform (FFT) discretizes a frequency space to a specific resolution and can also result in spectral leakage (e.g., Nyquist oversampling). Given the fundamental frequency defined in a search frequency region S of interest, these characteristics can make identification of $m^{th}$ harmonics in the frequency spectrum ambiguous. A real $m^{th}$ harmonic component can lie at anywhere between adjacent discretized frequencies $$m \times \left(\omega \pm \frac{\Delta\omega}{2}\right)$$

corresponding to a fundamental frequency of $\omega$ and a frequency resolution of $\Delta\omega$. To avoid this ambiguity in harmonic frequency identification, peak spectra for multiple harmonics can be extracted from a frequency spectrum as defined below.

Assigning s as the index of a fundamental frequency, its $m^{th}$ harmonic component is assumed to be bounded in a frequency region defined by a lower index $I_L$ and an upper index $I_U$, which are given by:

$$I_L = \lceil m \cdot \Delta\omega \cdot (s - \tfrac{1}{2}) \rceil \text{ and } I_U = \lfloor m \cdot \Delta\omega \cdot (s + \tfrac{1}{2}) \rfloor \quad (12)$$

Here, $\lceil \ \rceil$ and $\lfloor \ \rfloor$ are ceiling and floor functions, respectively. The index of the $m^{th}$ harmonic component $I_m$ is obtained using a peak search in the above region by:

$$I_m = \arg \max[A(I)], I \in [I_L, I_U] \quad (13)$$

Here, $A(I)$ is the magnitude of frequency spectrum at the index I.

With this definition, one particular frequency component and its index can be used for different combinations of a fundamental frequency and its harmonics. That is, recurrence and/or partial overlapping are possibly encountered when using multiple harmonics.

After learning the various weights, estimating rotational frequency of the rotating member can be performed. Estimation involves using Eq. (2), or alternatively, using conditions specified in Eq. (10) or Eq. (11) to apply the various weighting functions to the sensed vibrations in the frequency spectrum, depending on the initial choices of combination of harmonics and the particular form of the optimization problem. The frequency corresponding to the maximum amplitude within the frequency spectrum of the sensed vibrations is selected as an estimate of the rotational frequency of the rotating member.

Preprocessing can be performed before weighting the frequency spectrum. The preprocessing step may be used to improve signal quality by removing known noises and/or reducing the amount of data for further processing. These preprocessing steps can be applied to obtain weighted frequency spectrums if such steps were also used in generating the training data sets.

Figure 2:
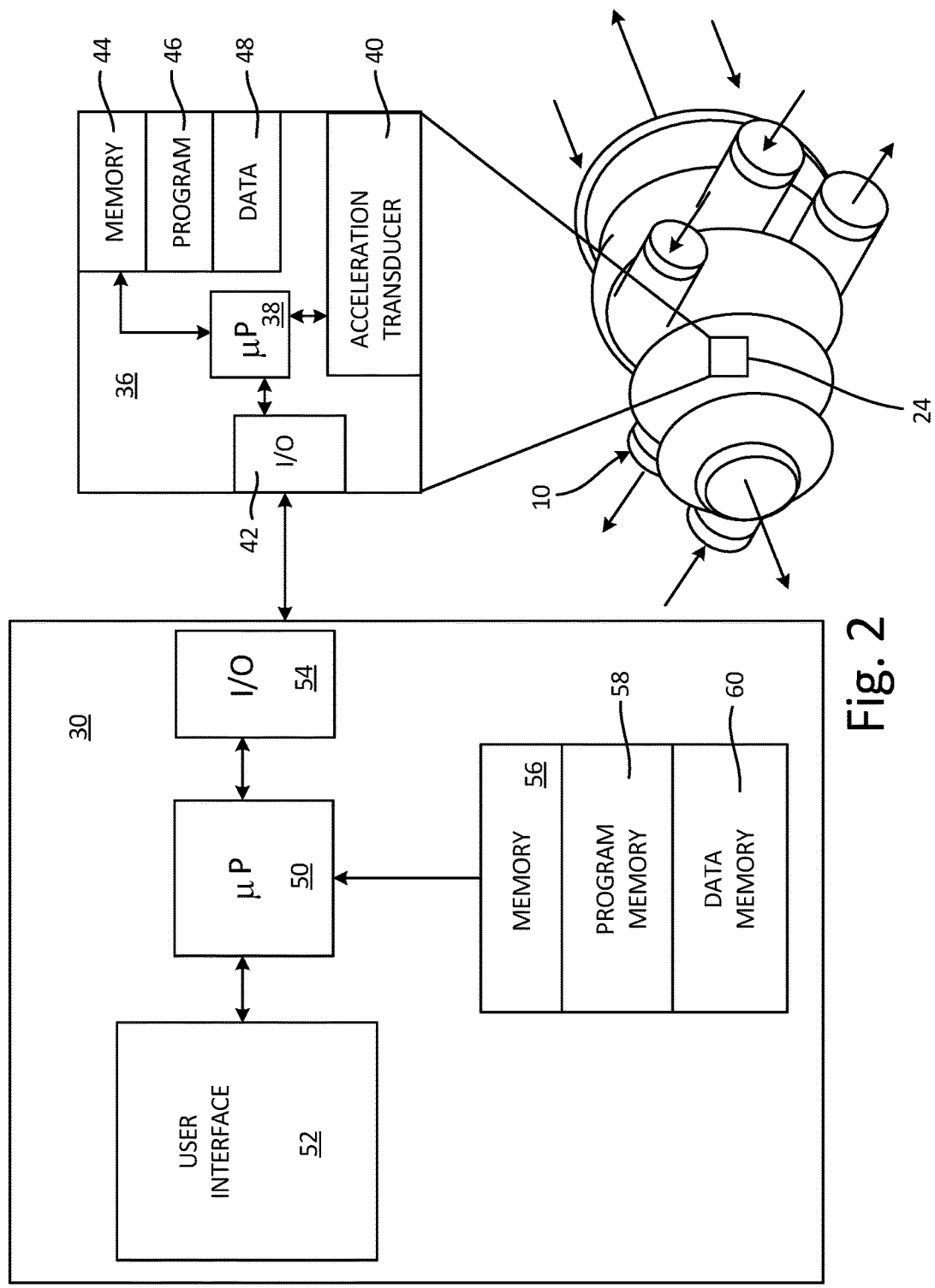
FIG. 2 is a block diagram of an exemplary system for generating a frequency spectrum weighting function for use in estimating a rotational frequency of a rotating member.

FIG. 2 is a block diagram of an exemplary system for generating a frequency spectrum weighting function for use in estimating a rotational frequency of a rotating member. In FIG. 2, weight generating system 30 for generating a frequency spectrum weighting function is in communication with mechanical system 32. The mechanical system 32 has: rotating member 34 and accelerometer system 36. The term 'rotating member' indicates a member capable of rotation regardless of whether the member is actually rotating. Accelerometer system 36 includes: microprocessor 38; acceleration transducer 40; input/output interface 42; and memory module 44. Memory module 44 includes program memory locations 46 and data memory locations 48.

Weight generating system 30 includes microprocessor 50; user interface 52; input/output interface 54; and memory module 56. Memory module 56 includes program memory locations 58 and data memory locations 60. Weight generating system 30 can be any device capable of executing computer-readable instructions defining a software program. Examples of weight generating system 30 can include, but are not limited to, laptop computers, mobile phones (including smartphones), tablet computers, personal digital assistants (PDAs), desktop computers, servers, mainframes, or other computing devices. In some examples, weight generating system 30 can be an avionics unit configured for use on an aerial vehicle, such as a helicopter, unmanned aerial vehicle (UAV), or other aircraft. An exemplary weight generating system can be an embedded system component of an aircraft diagnostic/control system. In some embodiments, embedded system realizations may not require a user interface.

Supervised learning techniques may be used in the configuration depicted in FIG. 2 for generating a frequency spectrum weighting function to facilitate identification of a rotational frequency of rotating member 34. Mechanical system 32 may be controlled such that mechanical system 32 is operated in various operating states. In each operating state, rotating member 34 rotates at a specific rotational frequency. The specific operating frequency can be measured using an independent measurement tool or by some other method. Acceleration transducer 40 produces a temporal signal for each operating state. The temporal signal is indicative of a sensed vibration at the location where accelerometer system 36 is affixed to mechanical system 32.

Microprocessor 38 communicates with weight generating system 30, via input/output interface 42 and input/output interface 54. Microprocessor 38 either transmits the temporal signals for each operating state to weight generating system 30 or first transforms the temporal signals to frequency domain and then transmits the resulting FFTs or frequency spectra to weight generating system 30. Microprocessor 50 of weight generating system 30 transforms received temporal signals to frequency domain if such temporal signals are not transformed by accelerometer system 36. Microprocessor 50 then associates each of the resulting FFTs or frequency spectra with the specific rotational frequency at which the rotating member was rotating for each operating state.

Microprocessor 50 then performs the above detailed supervised learning algorithm on the frequency spectrum/rotational frequency pairs of data to obtain a frequency spectrum weighting function. Microprocessor 50 can then transmit the frequency spectrum weighting function to accelerometer system 36 for use in operation of mechanical system 32. Microprocessor 38 can store the received frequency spectrum weighting function in data memory locations 48, for example.

As illustrated in FIG. 2, both weight generating system 30 and accelerometer system 36 can include microprocessors 50, 38, respectively. Microprocessors 50, 38, in one example, are configured to implement functionality and/or process instructions for execution within weight generating system and accelerometer system, respectively. For instance, microprocessors 50, 38 can be capable of processing instructions stored in program memories 58, 46, respectively. Examples of microprocessors 50, 38 can include any one or more of a microprocessor, a controller, a digital signal processor (DSP), an application specific integrated circuit (ASIC), a field-programmable gate array (FPGA), or other equivalent discrete or integrated logic circuitry.

Weight generating system 30 and accelerometer system 36 each are depicted as having memories 56, 44, respectively. Memories 56, 44 can be configured to store information within device 42 during operation. Memories 56, 44, in some examples, are described as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, memories 56, 44 are a temporary memory, meaning that a primary purpose of memories 56, 44 is not long-term storage.

Memories 56, 44, in some examples, are described as volatile memory, meaning that memories 56, 44 do not maintain stored contents when power to weight generating system 30 or accelerometer system 36, respectively, is turned off. Examples of volatile memories can include random access memories (RAM), dynamic random access memories (DRAM), static random access memories (SRAM), and other forms of volatile memories. In some examples, memories 56, 44 are used to store program instructions for execution by microprocessor 50, 38, respectively. Memories 56, 44, in one example, are used by software or applications (e.g., a software program) running on weight generating system 30 and accelerometer system 36, respectively, to temporarily store information during program execution.

Memories 56, 44, in some examples, also include one or more computer-readable storage media. Memories 56, 44 can be configured to store larger amounts of information than volatile memory. Memories 56, 44 can further be configured for long-term storage of information. In some examples, memories 56, 44 include non-volatile storage elements. Examples of such non-volatile storage elements can include magnetic hard discs, optical discs, floppy discs, flash memories, or forms of electrically programmable memories (EPROM) or electrically erasable and programmable (EEPROM) memories.

Memories 56, 44 can be include locations for operating systems, applications, data, data mappings, device drivers, services and utilities, and operating system interfaces, etc. Operating systems can be executable by processors 50, 38 to control the operation of components of weight generating system 30 and accelerometer system 36, respectively. In some examples, an operating system can be a real-time operating system (RTOS) that schedules execution of applications executing on microprocessors 50 and/or 38 and serves real-time application requests, such as requests for access to memories 50, 44, respectively (e.g., read and/or write requests).

Various embodiments of weight generating system 30 and/or accelerometer system 36 may include various communications device(s), input device(s), output device(s), and storage device(s). However, in certain examples, weight generating system 30 and accelerometer system 36 can include more or fewer components than are depicted in FIG. 2. In some examples, such as where device 42 is a mobile or portable device such as a laptop computer, weight generating system 30 and/or accelerometer system 36 may include additional components such as a battery that provides power to components of device 42 during operation.

Weight generating system 30 and/or accelerometer system 36, in some examples, also includes communications device(s). Weight generating system 30 and accelerometer system 36, in one example, utilizes communication device(s) to communicate with external devices via one or more networks, such as one or more wireless or wired networks or both. Communications device(s) can be a network interface card, such as an Ethernet card, an optical transceiver, a radio frequency transceiver, or any other type of device that can send and receive information. Other examples of such network interfaces can include Bluetooth, 3G, 4G, and WiFi radio computing devices as well as Universal Serial Bus (USB).

Weight generating system 30, in some examples, also includes User interface 52. User interface 52, in some examples, is configured to receive input from a user. Examples of User interface 52 can include a mouse, a keyboard, a microphone, a camera device, a presence-sensitive and/or touch-sensitive display, or other type of device configured to receive input from a user. user interface 52 can be configured to provide output to a user. Examples of output User interface 52 can include a display device, a sound card, a video graphics card, a speaker, a cathode ray tube (CRT) monitor, a liquid crystal display (LCD), a light emitting diode (LED) display, an organic light emitting diode (OLED) display, or other type of device for outputting information in a form understandable to users or machines.

Figure 3:
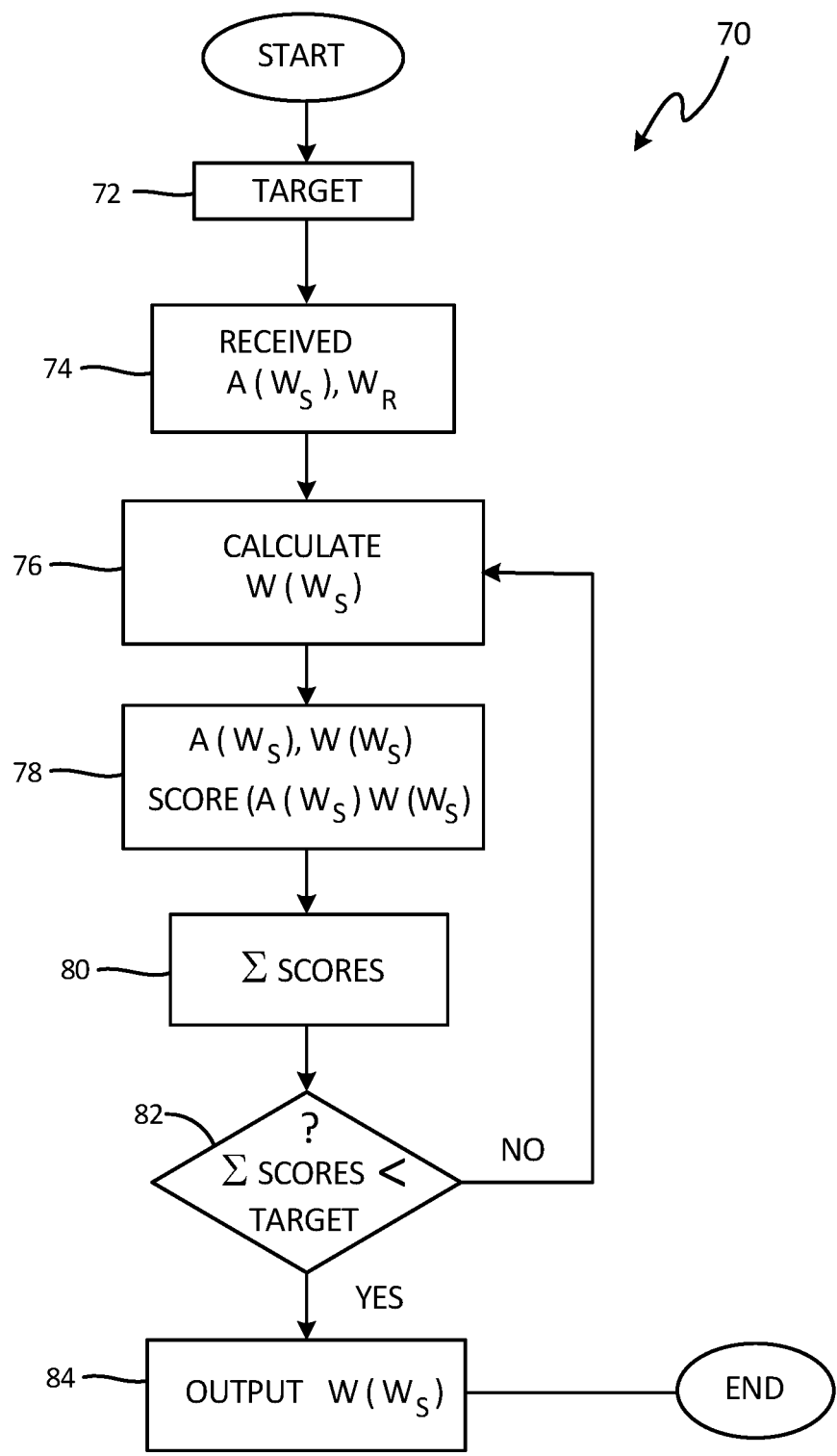
FIG. 3 is a flow chart of an exemplary method of generating a frequency spectrum weighting function for use in estimating a rotational frequency of a rotating member.

FIG. 3 is a flow chart of an exemplary method of generating a frequency spectrum weighting function for use in estimating a rotational frequency of a rotating member. In FIG. 3, method 70 is shown from the perspective of microprocessor 50 depicted in FIG. 2. Method 70 begins at step 72 with microprocessor 50 retrieving a target used for determining an end condition for method 70. Then at step 74, microprocessor 50 receives a set of test vectors. Each test vector includes a rotational frequency value co, indicative of a rotational frequency of the rotating member. Each test vector also includes a vibrational frequency spectrum $A(\omega_s)$ corresponding to vibrations propagated to the accelerometer remotely located from the rotating member. The vibrations include vibrations caused by the rotating member rotating at the rotational frequency.

The method continues, at step 76, with microprocessor 50 calculating a test weighting function $W(\omega_s)$. Then at step 78, microprocessor 50 calculates a set of weighted test vectors $[W(\omega_s)A(\omega_s), V_{SCORE}]$. Each of the weighted test vectors $[W(\omega_s)A(\omega_s), V_{SCORE}]$ includes a weighted vibrational frequency spectrum $W(\omega_s)A(\omega_s)$ calculated by taking a product of vibrational frequency spectrum of a corresponding one of the test vectors and the test weighting function. Each of the weighted test vectors also includes a vector score relating an amplitude of the weighted vibrational frequency spectrum corresponding to the rotational frequency of the rotating member to a maximum amplitude of the weighted vibrational frequency spectrum corresponding to frequencies not including the rotational frequency of the rotating member.

The method continues, at step 80, with microprocessor 50 calculating a set score $S_{SCORE}$ by summing the vector scores of the set of weighted test vectors. Then, at step 82, microprocessor 50 evaluates an end condition, whereby the calculated set score $S_{SCORE}$ is compared with the target retrieved at step 72. If the end condition is met, then, at step 84 the frequency spectrum weighting function is assigned to the test weighting function that was last calculated, and method 70 ends. However, if the end condition is not met, then method 70 returns to step 76 where microprocessor 50 calculates a new test weighting function $W(\omega_s)$.

An apparatus for estimating, using a frequency spectrum weighting function, a rotational frequency of a rotating member includes an accelerometer. The apparatus includes one or more processors. The apparatus also includes one or more storage devices encoded with instructions that when executed by the one or more processors, cause the apparatus to perform a method for estimating the rotational frequency of the rotating member. The method includes retrieving, from the one or more storage devices, the frequency spectrum weighting function. The method includes receiving, from the accelerometer, temporal signals indicative of vibrations, the vibrations sensed by the accelerometer remotely located from the rotating member. The method includes transforming the temporal signals indicative of the vibrations to the vibrational frequency spectrum. The method includes calculating a weighted vibrational frequency spectrum by taking a product of vibrational frequency spectrum and the frequency spectrum weighting function. The method includes selecting a frequency corresponding to a maximum amplitude of the weighted vibrational frequency spectrum. The method also includes associating the frequency corresponding to the maximum amplitude of the weighted frequency spectrum with the rotational frequency of the rotating member.

A further embodiment of the foregoing apparatus, wherein the one or more storage devices are encoded with instructions that, when executed by the processor, can cause the apparatus to perform the steps a-f two or more times so as to estimate two or more rotational frequencies of two or more rotating members, respectively. A further embodiment of any of the foregoing fan drive gear systems, wherein the accelerometer can be coupled to a stationary member of a mechanical system to which the rotating member is coupled.

An apparatus for generating a frequency spectrum weighting function for use in estimating, using vibrations sensed by an accelerometer remotely located from a rotating member, a rotational frequency of the rotating member includes one or more processors. The apparatus includes one or more storage devices encoded with instructions that, when executed by the one or more processors, cause the apparatus to perform a method for generating the frequency spectrum weighting function. The method includes receiving a set of test vectors. Each test vector includes a rotational frequency value indicative of a rotational frequency of the rotating member. Each test vector also includes a vibrational frequency spectrum corresponding to vibrations propagated to the accelerometer remotely located from the rotating member, the vibrations including vibrations caused by the rotating member rotating at the rotational frequency. The method includes calculating a test weighting function. The method includes calculating a set of weighted test vectors. Each weighted test vector includes a weighted vibrational frequency spectrum calculated by taking a product of vibrational frequency spectrum of a corresponding one of the test vectors and the test weighting function. Each weighted test vector also includes a vector score relating an amplitude of the weighted vibrational frequency spectrum corresponding to the rotational frequency of the rotating member to a maximum amplitude of the weighted vibrational frequency spectrum corresponding to frequencies not including the rotational frequency of the rotating member. The method includes calculating a set score by summing the vector scores of the set of weighted test vectors. The method also includes evaluating an end condition. If the end condition is met, then the frequency spectrum weighting function is assigned to the test weighting function that was last calculated. If the end condition is not met, however, then the microprocessor performs steps b-e again.

A further embodiment of the foregoing apparatuses. Calculating the test weighting function can include calculating a gradient of the set score with respect to the test weighting function. Calculating the test weighting function also can include calculating, based on the calculated gradient, a gradient descent direction. A further embodiment of any of the foregoing apparatuses, wherein the accelerometer can be coupled to a stationary member of a mechanical system to which the rotating member is coupled. A further embodiment of any of the foregoing apparatuses, wherein the storage device can be further encoded with instructions that, when executed by the processor, cause the device to perform the additional step of storing, in the one or more storage devices, the frequency spectrum weighting function corresponding to the rotating member. A further embodiment of any of the foregoing apparatuses, wherein the one or more storage devices can be encoded with instructions that, when executed by the processor, cause the apparatus to perform the steps a-e two or more times so as to generate two or more frequency spectrum weighting functions corresponding to two or more rotating members, respectively.

A further embodiment of any of the foregoing apparatuses, wherein the storage device can be further encoded with instructions that, when executed by the processor, cause the device to perform the additional steps of calculating the set of test vectors. A further embodiment of any of the foregoing apparatuses. Calculating the set of test vectors includes receiving, from the accelerometer, temporal signals indicative of the vibrations, the vibrations sensed by the accelerometer remotely located from the rotating member. Calculating the set of test vectors also includes transforming the temporal signals indicative of the vibrations to the vibrational frequency spectrum. A further embodiment of any of the foregoing apparatuses, wherein calculating the set of test vectors further can include associating the vibrational frequency spectrum with the rotational frequency of the rotating member.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An apparatus for estimating, using a frequency spectrum weighing function, a rotational frequency of a rotating member, the apparatus comprising:
    an accelerometer;
    one or more processors; and
    one or more storage devices encoded with instructions that, when executed by the one or more processors, cause the apparatus to perform the steps of:
        a) calculating, using the one or more processors, a frequency spectrum weighting function;
        b) storing, in one or more storage devices, the frequency spectrum weighting function;
        c) retrieving, from one or more storage devices, the frequency spectrum weighting function;
        d) receiving, from the accelerometer, temporal signals indicative of vibrations, the vibrations sensed by the accelerometer remotely located from the rotating member;
        e) transforming, by the one or more processors, the temporal signals indicative of the vibrations to a vibrational frequency spectrum;
        f) calculating, by the one or more processors, a weighted vibrational frequency spectrum by taking a product of the vibrational frequency spectrum and the frequency spectrum weighting function;
        g) selecting, by the one or more processors, a frequency corresponding to a maximum amplitude of the weighted vibrational frequency spectrum; and
        h) identifying, by the one or more processors, the frequency corresponding to the maximum amplitude of the weighted frequency spectrum as the rotational frequency of the rotating member.

2. The apparatus of claim 1, wherein the one or more storage devices are encoded with instructions that, when executed by the processor, cause the apparatus to perform the steps a-h two or more times so as to estimate two or more rotational frequencies of two or more rotating members, respectively.

3. The apparatus of claim 1, wherein the accelerometer is coupled to a stationary member of a mechanical system to which the rotating member is coupled.

4. A method of estimating, from vibrations sensed by an accelerometer remotely located from a rotating member, by using a frequency spectrum weighting function, a rotational frequency of the rotating member, the method comprising the steps of:
    a) calculating, using the one or more processors, a frequency spectrum weighting function;
    b) storing, in one or more storage devices, the frequency spectrum weighting function;
    c) retrieving, from the one or more storage devices, the frequency spectrum weighting function;
    d) receiving, from the accelerometer, temporal signals indicative of vibrations from the rotating member rotating at the rotational frequency;
    e) transforming, by a processor, the temporal signals indicative of the vibrations to a vibrational frequency spectrum;
    f) calculating, by the processor, a weighted vibrational frequency spectrum by taking a vector product of vibrational frequency spectrum and the frequency spectrum weighting function;
    g) selecting, by a processor, a frequency corresponding to a maximum amplitude of the weighted vibrational frequency spectrum;
    h) associating the frequency corresponding to the maximum amplitude of the weighted frequency spectrum with the rotational frequency of the rotating member; and
    i) identifying, by the one or more processors, the frequency corresponding to the maximum amplitude of the weighted frequency spectrum as the rotational frequency of the rotating member.

5. The method of claim 4, wherein the steps a-i are repeated two or more times using two or more different frequency spectrum weighting functions so as to estimate two or more rotational frequencies of two or more rotating members, respectively.

6. An apparatus for generating a frequency spectrum weighting function for use in estimating, using vibrations sensed by an accelerometer remotely located from a rotating member, a rotational frequency of the rotating member, the apparatus comprising:
an accelerometer remotely located from the rotating member, the accelerometer configured to sense vibrations from the rotating member and to estimate:
a rotational frequency value indicative of a rotational frequency of the rotating member; and
a vibrational frequency spectrum corresponding to vibrations propagated to the accelerometer remotely located from the rotating member, the vibrations including vibrations caused by the rotating member rotating at the rotational frequency;
one or more processors; and
one or more storage devices encoded with instructions that, when executed by the one or more processors, cause the apparatus to perform the steps of:
a) receiving, from the one or more storage devices, a set of test vectors, each test vector including:
the rotational frequency value; and
the vibrational frequency spectrum;
b) calculating, using the set of test vectors, a test weighting function;
c) calculating, using the one or more processors, a set of weighted test vectors, each weighted test vector including:
a weighted vibrational frequency spectrum calculated by taking a product of a vibrational frequency spectrum of a corresponding one of the test vectors and the test weighting function; and
a vector score relating an amplitude of the weighted vibrational frequency spectrum corresponding to the rotational frequency of the rotating member to a maximum amplitude of the weighted vibrational frequency spectrum corresponding to frequencies not including the rotational frequency of the rotating member;
d) calculating, using the one or more processors, a set score by summing the vector scores of the set of weighted test vectors; and
e) evaluating, using the one or more processors, an end condition,
wherein, if the end condition is met, then the frequency spectrum weighting function is assigned to the test weighting function that was last calculated;
wherein if the end condition is not met, then the one or more processors performs steps b-e again.

7. The apparatus of claim 6, wherein calculating the test weighting function comprises:
calculating a gradient of the set score with respect to the test weighting function; and
calculating, based on the calculated gradient, a gradient descent direction.

8. The apparatus of claim 6, wherein the accelerometer is coupled to a stationary member of a mechanical system to which the rotating member is coupled.

9. The apparatus of claim 6, wherein the one or more storage devices are further encoded with instructions that, when executed by the one or more processors, cause the device to perform the additional step of:
storing, in the one or more storage devices, the frequency spectrum weighting function corresponding to the rotating number.

10. The apparatus of claim 6, wherein the one or more storage devices is encoded with instructions that, when executed by the one or more processors, cause the apparatus to perform steps a-e two or more times so as to generate two or more frequency spectrum weighting functions corresponding to two or more rotating members, respectively.

11. The apparatus of claim 6, wherein the device is further encoded with instructions that, when executed by the one or more processors, cause the device to perform the additional step of:
calculating the set of test vectors.

12. The apparatus of claim 11, wherein calculating the set of test vectors comprises:
receiving, from the accelerometer, temporal signals indicative of the vibrations, the vibrations sensed by the accelerometer remotely located from the rotating member; and
transforming the temporal signals indicative of the vibrations to the vibrational frequency spectrum.

13. The apparatus of claim 12, wherein calculating the set of test vectors further comprises:
associating the vibrational frequency spectrum with the rotational frequency of the rotating member.

14. A method of estimating, using vibrations sensed by an accelerometer remotely located from a rotating member, a rotational frequency of the rotating member using a frequency spectrum weighting function, the method comprising the steps of:
a) receiving a set of initial test vectors from one or more processors, each test vector including:
a rotational frequency value indicative of a rotational frequency of the rotating member; and
a vibrational frequency spectrum corresponding to vibrations propagated to the accelerometer remotely located from the rotating member, the vibrations including vibrations caused by the rotating member rotating at the rotational frequency;
b) calculating, using the one or more processors, a test weighting function;
c) calculating, using the one or more processors, a set of weighted test vectors, each weighted test vector including;
a weighted vibrational frequency spectrum calculated by taking a product of vibrational frequency spectrum of a corresponding one of the test vectors and the test weighting function; and
a vector score relating an amplitude of the weighted vibrational frequency spectrum corresponding to the rotational frequency of the rotating member to a maximum amplitude of the weighted vibrational frequency spectrum corresponding to frequencies not including the rotational frequency of the rotating member;
d) calculating, using the one or more processors, a set score by summing the vector scores of the set of weighted test vectors; and
e) evaluating, using the one or more processors, an end condition;
wherein if the end condition is met, then the frequency spectrum weighting function is assigned to the test weighting function that was last calculated, wherein if the end condition is not met, then the microprocessor performs steps b-e again.

15. The method of claim 14, wherein calculating a test weighting function comprises:
   calculating a gradient of the set score with respect to the test weighting function; and
   calculating, based on the calculated gradient, a gradient descent direction.

16. The method of claim 15, wherein calculating a test weighting function further comprises:
   calculating a gradient descent distance.

17. The method of claim 14, further comprising:
   storing, in the one or more storage devices, the frequency spectrum weighting function corresponding to the rotating member.

18. The method of claim 14, further comprising:
   calculating the set of test vectors.

19. The method of claim 18, wherein calculating the set of test vectors comprises:
   receiving, from the accelerometer, temporal signals indicative of the vibrations, the vibrations sensed by the accelerometer remotely located from the rotating member; and
   transforming the temporal signals indicative of the vibrations to the vibrational frequency spectrum.

20. The method of claim 19, wherein calculating the set of test vectors further comprises:
   associating the vibrational frequency spectrum with rotational frequency of the rotating member.

\* \* \* \* \*